US 12,447,871 B2

United States Patent
Kancharla

(10) Patent No.: US 12,447,871 B2
(45) Date of Patent: Oct. 21, 2025

(54) PASSENGER SEAT WITH FORWARD ADJUSTABLE BACKREST

(71) Applicant: BE Engineering Services India Private Limited, Hyderabad (IN)

(72) Inventor: Seeta R Kancharla, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 236 days.

(21) Appl. No.: 18/129,610

(22) Filed: Mar. 31, 2023

(65) Prior Publication Data
US 2023/0382275 A1 Nov. 30, 2023

(30) Foreign Application Priority Data
May 26, 2022 (IN) .............................. 202241030327

(51) Int. Cl.
*B64D 11/06* (2006.01)
*B60N 2/02* (2006.01)
*B60N 2/22* (2006.01)
*B60N 2/68* (2006.01)

(52) U.S. Cl.
CPC ............. *B60N 2/22* (2013.01); *B60N 2/0284* (2013.01); *B60N 2/686* (2013.01); *B64D 11/0639* (2014.12)

(58) Field of Classification Search
CPC .... B64D 11/0639; B60N 2/22; B60N 2/2222; B60N 2/203; B60N 2/0284
See application file for complete search history.

(56) References Cited

U.S. PATENT DOCUMENTS

| | | | | |
|---|---|---|---|---|
| 1,332,957 | A * | 3/1920 | Schramm | B60N 2/22 5/59.1 |
| 6,695,378 | B2 | 2/2004 | Hanagan | |
| 7,490,906 | B2 * | 2/2009 | Schumacher | A47C 7/407 296/65.01 |
| 9,326,608 | B1 | 5/2016 | Hoy et al. | |
| 2019/0308732 | A1 | 10/2019 | Croudace | |

(Continued)

FOREIGN PATENT DOCUMENTS

| | | | | |
|---|---|---|---|---|
| CN | 114364572 | A * | 4/2022 | ............... B60N 2/68 |
| EP | 3604133 | B1 | 5/2021 | |

(Continued)

OTHER PUBLICATIONS

Extended European Search Report dated Sep. 29, 2023; European Application No. 23175783.2.

*Primary Examiner* — Timothy J Brindley
(74) *Attorney, Agent, or Firm* — Suiter Swantz IP

(57) ABSTRACT

A passenger seat, for instance an aircraft passenger seat, including a seat pan, a backrest frame coupled to the seat pan, a backrest supported by the backrest frame, and an adjustment mechanism coupling the backrest to the backrest frame, the adjustment mechanism operable to translate the backrest forward or aft relative to the backrest frame to change a position of the backrest relative to the seat pan. In use, translation motion of the backrest is independent of pivoting motion of the backrest frame and the backrest position is adjustable relative to the seat pan to provide seat ergonomics commensurate with the stature of the seat occupant. In embodiments, the adjustment mechanism is manual and accessible from above the backrest.

11 Claims, 5 Drawing Sheets

(56) References Cited

U.S. PATENT DOCUMENTS

2020/0307430 A1* 10/2020 Watanabe ................ B60N 2/68
2022/0089070 A1* 3/2022 Malapati ............ B60N 2/42745
2024/0051435 A1* 2/2024 Mastroianni ............. B60N 2/22

FOREIGN PATENT DOCUMENTS

JP       S63147326 A     9/1988
WO    WO-2013160147 A1 * 10/2013 ........... B60N 2/0232

* cited by examiner ant application claims the benefit of
PASSENGER SEAT WITH FORWARD ADJUSTABLE BACKREST

CROSS-REFERENCE AND INCORPORATION BY REFERENCE

This nonprovisional application claims the benefit of Indian Provisional Application Number 202241030327 filed May 26, 2022, which is incorporated by reference herein in its entirety.

TECHNICAL FIELD AND BACKGROUND

The present disclosure relates generally to a passenger seat for a conveyance such as an aircraft, and more particularly to a passenger seat equipped with a mechanism for adjusting a backrest relative to a seat pan to accommodate passengers of different statures.

Passenger seats in conveyances such as aircraft are designed to accommodate a predetermined percentile of the traveling population. For example, aircraft passenger seats may be designed to accommodate the 90% or 95% percentile adult male passenger in terms of stature. As such, the ergonomics of the passenger seat may not be supportive and comfortable for the 10% or 5% passenger stature falling outside of the predetermined range, for instance passengers of short stature and children.

Most passenger seats are equipped with a seat pan and a backrest providing comfort and support to the passenger via a cradling sitting position. In the case of airliners and economy class seats, the seat pan is typically fixed with a slight forward incline and the backrest is minimally reclinable between taxi, takeoff and landing (TTOL) and in-flight sitting positions. In premium seating classes, the greater seat pitch allows for greater seat adjustability and in some cases lie flat seats.

In any of the achievable sitting positions of conventional passenger seats, the seat pan has a fixed minimal length, and the backrest may change in angle relative to the seat pan but does not translate forward or aft relative to the seat pan. As such, the seat pan may be too long to allow the knees of passengers of short stature to properly bend around the forward end of the seat pan. During long haul flights, the inability of a passenger to bed their knees at the forward end of the seat pan can become uncomfortable and, in some instances, cause the passenger to move their back off the backrest to position their knees farther forward to reach the forward end of the seat pan. Such shifting on the seat positions the passenger out of sync with the seat support elements and decreases the effectiveness of the passenger restraint.

Therefore, what is needed is a passenger seat with adjustment capability to accommodate passengers of different statures to provide proper ergonomics for all traveling passengers.

SUMMARY

Broadly speaking, the present disclosure provides a passenger seat, for instance an aircraft passenger seat, equipped with a translation backrest for adjusting seat ergonomics to accommodate passengers of different statures.

To achieve the foregoing and other advantages, the inventive aspects disclosed herein are directed to a passenger seat including a seat pan, a backrest frame coupled to the seat pan, a backrest supported by the backrest frame, and an adjustment mechanism coupling the backrest to the backrest frame. In the use, the adjustment mechanism operates to translate the backrest forward or aft relative to the backrest frame to change a position of the backrest relative to the seat pan.

In some embodiments, the backrest frame includes a fixed frame having spaced vertical members and at least one transverse member, and a moving frame movably coupled to the fixed frame. In use, movement of the moving frame relative to the fixed frame in a first direction causes the backrest to translate forward relative to the seat pan, and movement of the moving frame relative to the fixed frame in a second direction opposite the first direction causes the backrest to translate rearward relative to the seat pan.

In some embodiments, each of the spaced vertical members defines an elongate linear slot, the moving frame is disposed in and travels along the elongate linear slots of the spaced vertical members, and each of the spaced vertical members defines at least one guideway receiving at least one guide of the backrest, the at least one guide configured to travel along the at least one guideway as the backrest translates relative to the backrest frame.

In some embodiments, the adjustment mechanism includes an actuator rotatably disposed through an opening formed in the at least one transverse member of the backrest frame, the actuator having an externally threaded end threadably engaged in an internally threaded opening formed in the moving frame, wherein rotating the actuator in a first direction advances the actuator in the opening to raise the moving frame relative to the fixed frame and rotating the actuator in a second direction opposite the first direction lowers the moving frame relative to the fixed frame. The adjustment mechanism further includes a plurality of links coupled between the moving frame and the backrest, wherein the plurality of links translates the backrest forward as the moving frame raises and translates the backrest rearward as the moving frame lowers relative to the fixed frame.

In some embodiments, the actuator includes a handle, dial or the like formed at the end of the actuator opposite the externally threaded end operable for manipulating the actuator to rotate the actuator, and wherein the handle is positioned above the backrest frame to be accessible from above the seat.

In some embodiments, each of the plurality of links are pivotally attached at opposing ends to the moving frame and to the backrest.

In some embodiments, the backrest frame further includes vertically oriented rollers positioned along the at least one guideway facilitating movement of the at least one guide along the at least one guideway.

In some embodiments, the seat pan is fixed, the backrest frame is pivotally attached to the seat pan, and pivoting motion of the backrest frame relative to the seat pan is independent of translation motion of the backrest relative to the seat pan.

In another aspect, the inventive concepts of the present disclosure are directed to an aircraft passenger seat assembly including a seat pan, a backrest frame pivotally attached to the seat pan, a backrest supported by the backrest frame and free of attachment to the seat pan, and an adjustment mechanism coupling the backrest to the backrest frame, the adjustment mechanism operable to translate the backrest forward or aft relative to the backrest frame to change a position of the backrest relative to the seat pan independent of pivoting motion of the backrest.

In some embodiments, the backrest frame includes a fixed frame including spaced vertical members and at least one transverse member and a moving frame carried by and movable relative to the fixed frame. In use, movement of the moving frame relative to the fixed frame in a first direction causes the backrest to translate forward relative to the seat pan, and movement of the moving frame relative to the fixed frame in a second direction opposite the first direction causes the backrest to translate rearward relative to the seat pan.

In some embodiments, each of the spaced vertical members defines an elongate linear slot, the moving frame is disposed in and travels along the elongate linear slots of the spaced vertical members, and each of the spaced vertical members defines at least one rearwardly extending guideway receiving at least one rearwardly extending guide formed on the backrest, the at least one rearwardly extending guide configured to travel along the at least one rearwardly extending guideway as the backrest translates relative to the backrest frame.

In some embodiments, the adjustment mechanism includes an actuator rotatably disposed through an opening formed in the at least one transverse member of the backrest frame, the actuator having an externally threaded end threadably engaged in an internally threaded opening formed in the moving frame, wherein rotating the actuator in a first direction advances the actuator in the opening to raise the moving frame relative to the fixed frame and rotating the actuator in a second direction opposite the first direction lowers the moving frame relative to the fixed frame. The adjustment mechanism further includes a plurality of links coupled between the moving frame and the backrest, wherein the plurality of links move toward horizontal to translate the backrest forward as the moving frame raises and move toward vertical to translate the backrest rearward as the moving frame lowers relative to the fixed frame.

In some embodiments, the actuator includes a handle, knob or the like formed at an end of the actuator opposite the externally threaded end operable for rotating the actuator, and wherein the handles is positioned above the backrest frame to be accessible from above the backrest.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides a passenger seat with backrest adjustability for accommodating seat occupants of different statures such that the seat ergonomics are met regardless of the size of the seat occupant. Whereas conventional passenger seats include reclinable backrests, the inventive concepts disclosed herein add the ability to translate the backrest relative to the seat pan, thereby 'shortening' the length of the seat pan to accommodate shorter passengers. The backrest translation is independent of the backrest recline, thus the recline and translation capabilities of the backrest are mutually exclusive. By decreasing the distance between the backrest and the forward end of the seat pan, a seat occupant with shorter thighs can bend their knees around the forward end of the seat while maintaining their back against the front of the backrest. In addition, backrest translation according to the present disclosure moves the entire backrest forward relative to the seat pan, which is different from conventional pivoting motions, lumbar mechanisms, etc.

Figure 1:
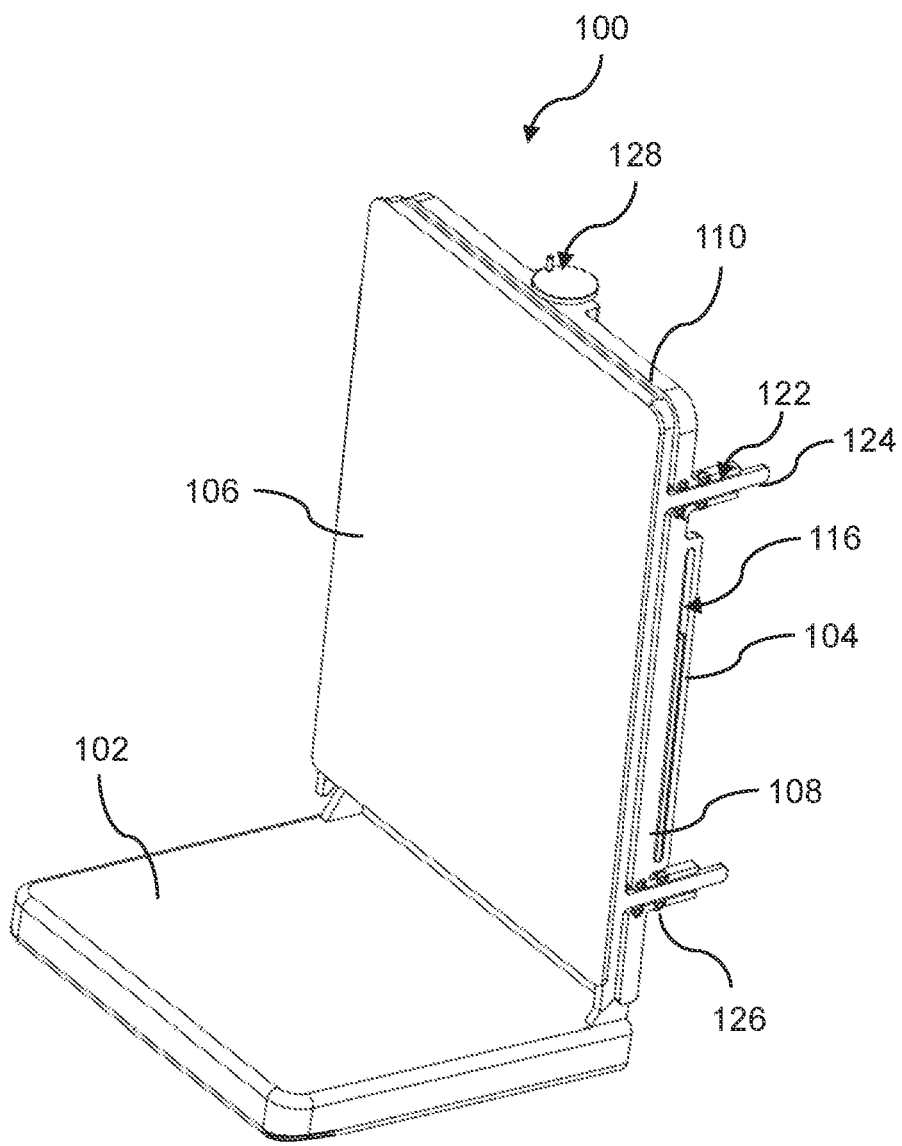
FIG. 1 shows a front isometric view of a passenger seat equipped with a backrest adjustment mechanism according to the present disclosure.
Figure 2:
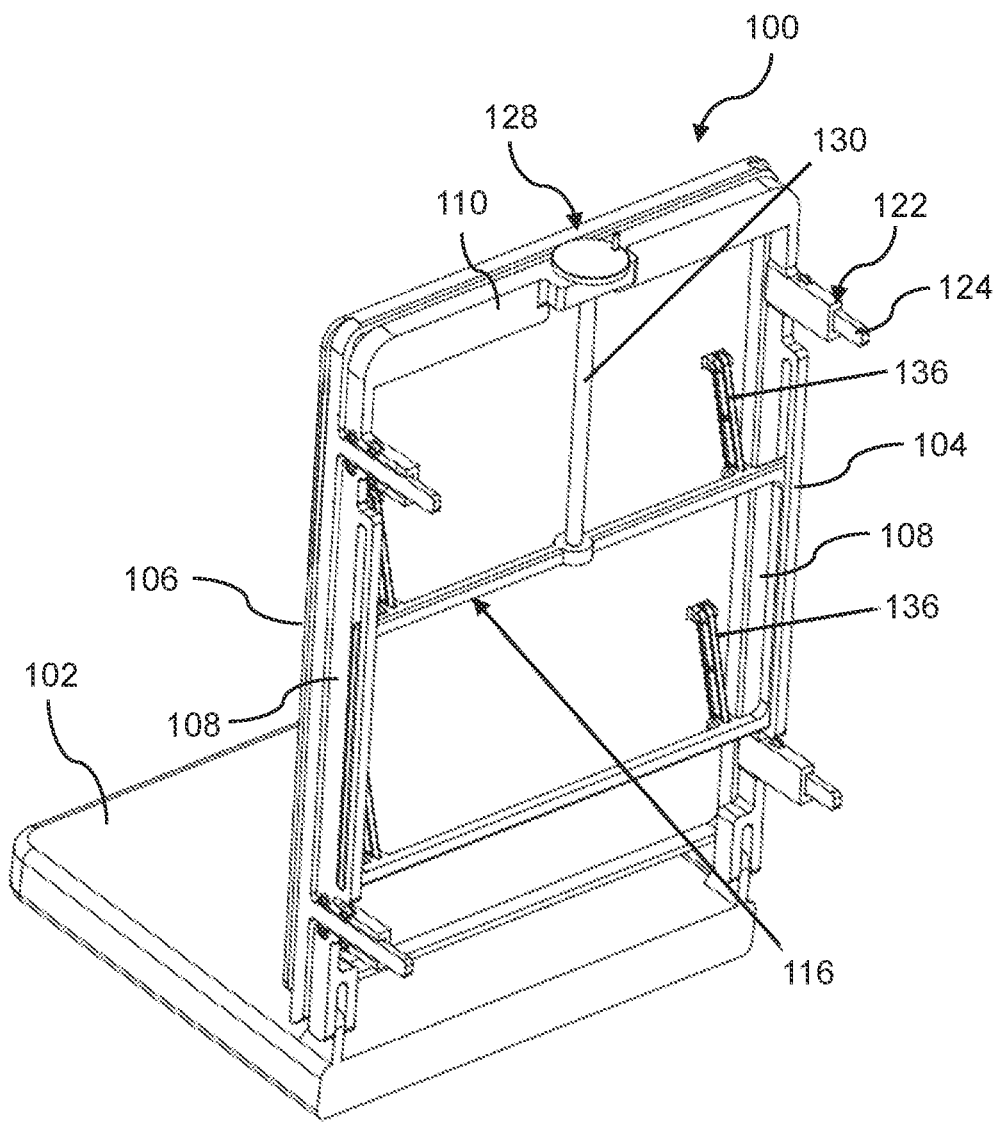
FIG. 2 shows a rear isometric view of the passenger seat of FIG. 1.
Figure 3:
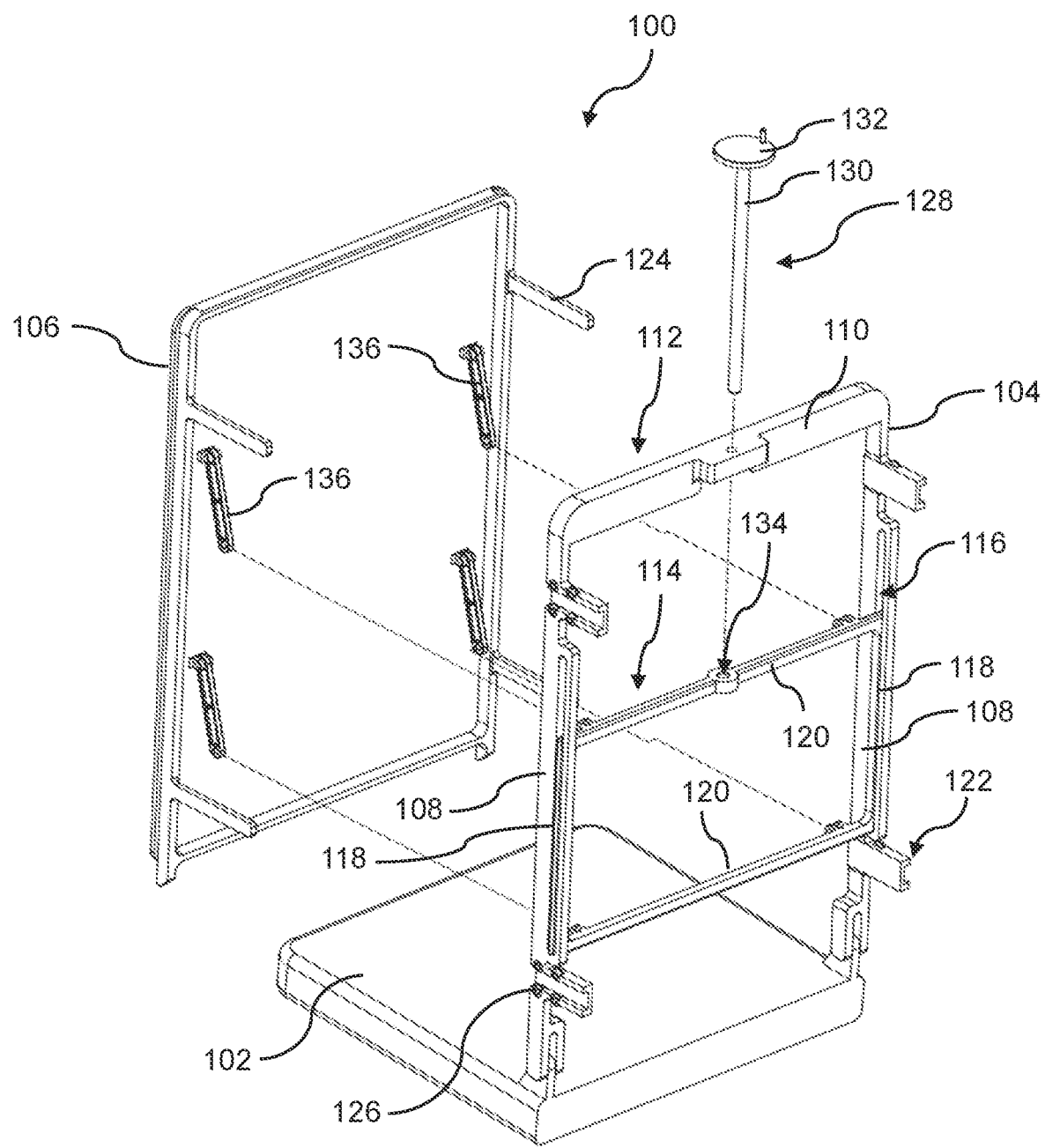
FIG. 3 shows an exploded view of the passenger seat of FIG. 1.

Referring to FIGS. 1-3, a passenger seat according to the present disclosure is shown at reference numeral 100. The passenger seat 100 generally includes a seat pan 102, a backrest frame 104 coupled to the seat pan, and a backrest 106 movably coupled to and support by the backrest frame. In some embodiments, the backrest frame 104 is pivotally attached to the seat pan or other seat frame member to permit the backrest to recline, for instance during flight. The seat pan 102 may be fixed and oriented with a slight incline toward the forward end to provide a cradling sitting position for comfort. Although not shown, the seat pan 102 may be supported on a seat frame, for example, seat spreaders interconnected by transverse beams wherein the seat pan is attached to the transverse beams. Optional seat elements may include, but are not limited to, armrests, lumbar mechanisms, headrests, thigh bolster, leg rests, etc.

FIGS. 1 and 2 show the backrest 106 in a fully rearward position relative to the seat pan for accommodating, for example, a seat occupant falling within the predetermined percentile of the seat design. The backrest frame 104 generally includes spaced vertical members 108 and at least one transverse member 110. As shown, the spaced vertical members 108 define the lateral extents of the backrest (i.e., seat width) and the transverse member 110 interconnects the upper ends of the spaced vertical members. As such, the spaced vertical members 108 and the at least one transverse member 110 form a generally U-shaped seat frame in which the terminal lower ends of the spaced frame members 108 are pivotally attached to the seat pan 102. The spaced vertical members 108 and the at least one transverse member 110 collectively form a fixed frame assembly 112, wherein fixed means stationary relative to a movable frame assembly discussed further below but movable relative to the seat pan in terms of pivoting motion.

A moving frame 114 is disposed within elongate slots 116 formed in each of the spaced vertical members 108. The moving frame 114 generally includes spaced vertical members 118 and spaced transverse members 120 forming a frame. The moving frame 114 is configured to translate up and down, i.e., raise and lower, relative to the fixed frame 112. The elongate slots 116 are linear and the length of the slots 116 is determinative of the amount of possible travel of the moving frame 114. In use, translating the moving frame 114 upward, i.e., raising, drives the backrest 106 forward relative to the seat pan 102, and translating the moving frame downward, i.e., lowering, drives the backrest rearward relative to the seat pan. Each of the fixed frame 112 and the moving frame 114 may be rigid unitary constructions or may be assemblies made up of attached parts.

The backrest frame 104 further defines a plurality of rearwardly extending, linear guideways 122 configured to receive rearwardly extending, linear guides 124 formed on the backrest 106. In use, the guides 124 travel along the guideways 122 to control forward and rearward motion of the backrest 106 while maintaining squareness. Vertically oriented rollers 126 disposed adjacent the guideways 122 interact with the guides 124 to facilitate smooth rolling motion as the backrest 106 cycles between the forward and rearward positions. Although four guideway and guide pairings are shown, other numbers and configurations or guideways and guides are possible and envisioned.

The passenger seat 100 further includes an adjustment mechanism 128 for changing the backrest position relative to the seat pan 102. The adjustment mechanism 128 as shown generally includes an actuator 130 configured to interact with the moving frame 114 to drive backrest movement. As shown, the actuator 130 is implemented as an elongate linear rod defining first and second or upper and lower opposing ends. The upper end terminates in a handle 132 for manipulating the actuator. For example, the handle 132 is grabbed to rotate the actuator 130 in opposite directions to adjust the backrest 106 forward or rearward. The handle 132 may also be a knob or the like, and in some embodiments, may be coupled to an electrical actuator.

The lower end of the actuator 130 is externally threaded to be threadably engaged in an internally threaded opening 134 formed in a transverse member of the moving frame 114. The actuator 130 is disposed through an opening formed in a transverse member of the fixed frame 112 and the threaded end is coupled to the moving frame 114. In this configuration, rotating the actuator 130 in a first direction causes the threaded end to advance into the moving frame 114 thereby raising the moving frame, and rotating the actuator in a second direction opposite the first direction causes the threaded end to withdraw from the moving frame thereby lowering the moving frame. The rotational functionality and threaded engagement between the actuator 130 and the moving frame 114 allow for stepless adjustability of the backrest position.

The handle 132 is positioned atop the fixed frame 112 to be accessible from above the seat. The adjustment mechanism may be operated by the seat occupant or flight crew depending on the application. The handle may be located elsewhere in other embodiments to be accessible by the seat occupant or concealed from view.

The passenger seat 100 further includes a plurality of links 136 coupling the backrest 106 to the backrest frame 104. Each link 136 is an elongate member pivotally attached at one end to the backrest 106 and at an opposing end to the backrest frame 104. In use, the links 136 move or orient toward horizontal as the backrest 106 translates forward and move or orient toward vertical as the backrest translates rearward. In other words, decreasing the distance between the upper extend of the moving frame 114 and the transverse member of the fixed frame 112 causes the links 136, which are rigid, to drive the backrest 106 forward and apart from the backrest frame 104, whereas increasing the distance between the moving frame and the transverse member of the fixed frame interacting with the handle cause the links to pull the backrest to toward the backrest frame. In some embodiments, the number of links 136 corresponds to the number of guideway/guide pairings to maintain stability and squareness.

Figure 4:
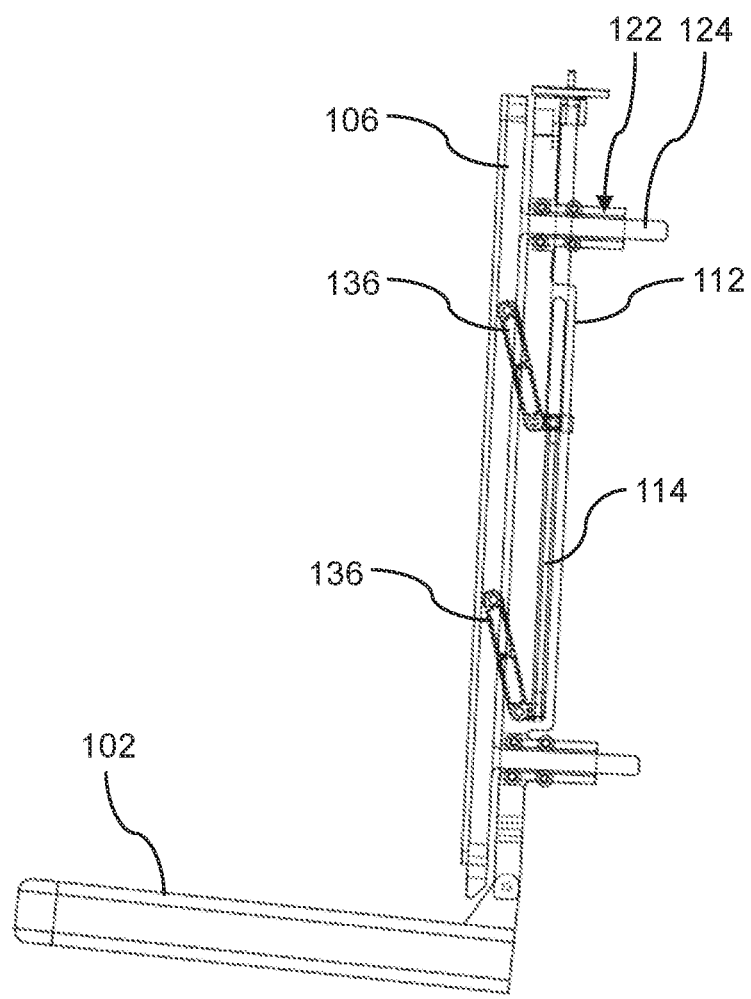
FIG. 4 shows a side view of the passenger seat of FIG. 1 with the backrest in a fully aft position.

Referring to FIG. 4, the moving frame 114 is shown in its lowest position relative to the fixed frame 112 and with the links 136 most vertical thereby corresponding to a fully rearward or retracted position of the backrest 106 relative to the seat pan 102. Such a backrest position accommodates seat occupants of greater stature.

Figure 5:
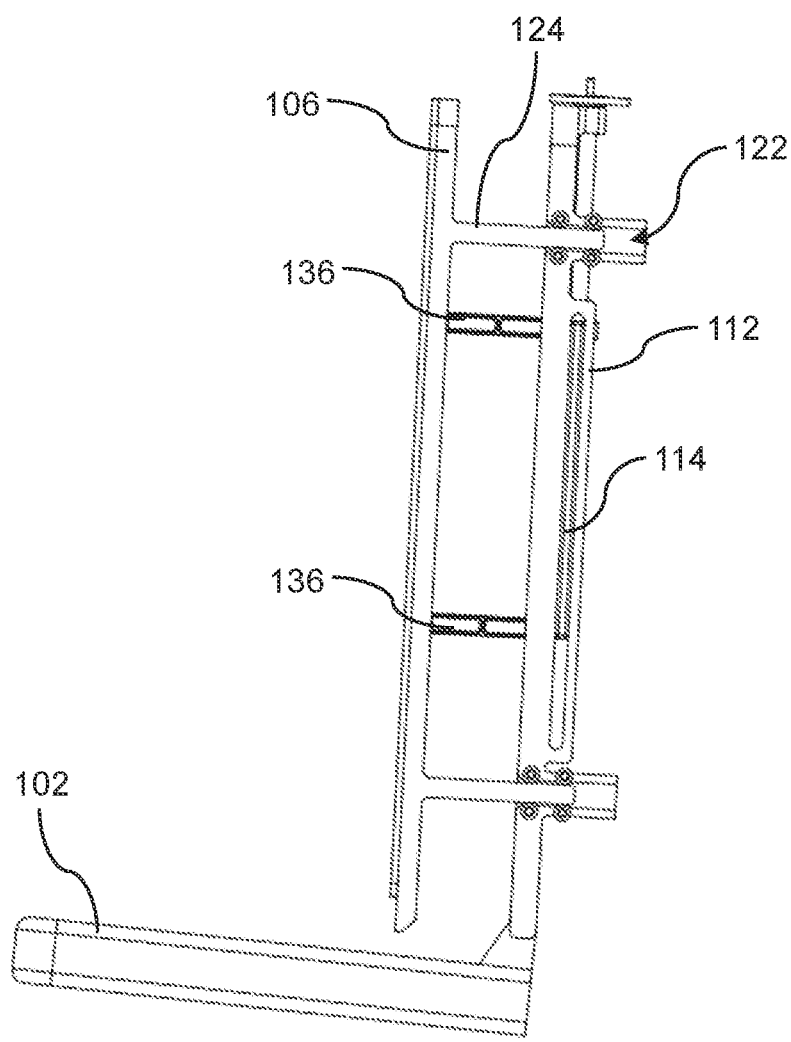
FIG. 5 shows a side view of the passenger seat of FIG. 1 with the backrest in a fully forward position.

Referring to FIG. 5, the moving frame 114 is shown in its highest position relative to the fixed frame 112 and with the links 136 most horizontal thereby corresponding to a fully forward or extended position of the backrest 106. Such a backrest position accommodates seat occupants of lesser stature as the seat pan length effectively 'shortens'. The amount of backrest adjustability, determined by at least one of the length of the elongate slots, interaction of the actuator with the moving frame, and length of the links, may be customized for different applications and to achieve different amounts of adjustability. Comparing FIGS. 4 and 5 further shows the guides 124 advancing and retreating relative to the guideways 122.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat, comprising:
    a seat pan;
    a backrest frame coupled to the seat pan;
    a backrest supported by the backrest frame; and
    an adjustment mechanism coupling the backrest to the backrest frame, the adjustment mechanism operable to translate the backrest forward or aft relative to the backrest frame to change a position of the backrest relative to the seat pan;
    wherein the backrest frame comprises:
        a fixed frame including spaced vertical members and at least one transverse member; and
        a moving frame movably coupled to the fixed frame;
        wherein movement of the moving frame relative to the fixed frame in a first direction causes the backrest to translate forward relative to the seat pan, and movement of the moving frame relative to the fixed frame in a second direction opposite the first direction causes the backrest to translate rearward relative to the seat pan; and
    wherein:
        each of the spaced vertical members defines an elongate linear slot;
        the moving frame is disposed in and travels along the elongate linear slots of the spaced vertical members; and
        each of the spaced vertical members defines at least one guideway receiving at least one guide of the backrest, the at least one guide configured to travel along the at least one guideway as the backrest translates relative to the backrest frame.

2. The passenger seat according to claim 1, wherein the adjustment mechanism comprises:
an actuator rotatably disposed through an opening formed in the at least one transverse member of the backrest frame, the actuator having an externally threaded end threadably engaged in an internally threaded opening formed in the moving frame, wherein rotating the actuator in a first direction advances the actuator in the opening to raise the moving frame relative to the fixed frame and rotating the actuator in a second direction opposite the first direction lowers the moving frame relative to the fixed frame; and
a plurality of links coupled between the moving frame and the backrest, wherein the plurality of links translate the backrest forward as the moving frame raises and translate the backrest rearward as the moving frame lowers relative to the fixed frame.

3. The passenger seat according to claim 2, wherein the actuator includes a handle formed at an end of the actuator opposite the externally threaded end operable for rotating the actuator, and wherein the handle is positioned above the backrest frame.

4. The passenger seat according to claim 2, wherein each of the plurality of links are pivotally attached at opposing ends to the moving frame and the backrest.

5. The passenger seat according to claim 1, further comprising vertically oriented rollers positioned along the at least one guideway facilitating movement of the at least one guide along the at least one guideway.

6. The passenger seat according to claim 1, wherein the seat pan is fixed, the backrest frame is pivotally attached to the seat pan, and pivoting motion of the backrest frame relative to the seat pan is independent of translation motion of the backrest relative to the seat pan.

7. An aircraft passenger seat assembly, comprising:
a seat pan;
a backrest frame pivotally attached to the seat pan;
a backrest supported by the backrest frame and free of attachment to the seat pan; and
an adjustment mechanism coupling the backrest to the backrest frame, the adjustment mechanism operable to translate the backrest forward or aft relative to the backrest frame to change a position of the backrest relative to the seat pan independent of pivoting motion of the backrest;
wherein the backrest frame comprises:
a fixed frame including spaced vertical members and at least one transverse member; and
a moving frame carried by and movable relative to the fixed frame;
wherein movement of the moving frame relative to the fixed frame in a first direction causes the backrest to translate forward relative to the seat pan, and movement of the moving frame relative to the fixed frame in a second direction opposite the first direction causes the backrest to translate rearward relative to the seat pan; and
wherein the adjustment mechanism comprises:
an actuator rotatably disposed through an opening formed in the at least one transverse member of the backrest frame, the actuator having an externally threaded end threadably engaged in an internally threaded opening formed in the moving frame, wherein rotating the actuator in a first direction advances the actuator in the opening to raise the moving frame relative to the fixed frame and rotating the actuator in a second direction opposite the first direction lowers the moving frame relative to the fixed frame; and
a plurality of links coupled between the moving frame and the backrest wherein the plurality of links move toward horizontal to translate the backrest forward as the moving frame raises and move toward vertical to translate the backrest rearward as the moving frame lowers relative to the fixed frame.

8. The aircraft passenger seat according to claim 7, wherein:
each of the spaced vertical members defines an elongate linear slot;
the moving frame is disposed in and travels along the elongate linear slots of the spaced vertical members; and
each of the spaced vertical members defines at least one rearwardly extending guideway receiving at least one rearwardly extending guide formed on the backrest, the at least one rearwardly extending guide configured to travel along the at least one rearwardly extending guideway as the backrest translates relative to the backrest frame.

9. The aircraft passenger seat according to claim 7, wherein the actuator includes a handle formed at an end of the actuator opposite the externally threaded end operable for rotating the actuator, and wherein the handles is positioned above the backrest frame to be accessible from above the backrest.

10. The aircraft passenger seat according to claim 7, wherein each of the plurality of links are pivotally attached at opposing ends to the moving frame and the backrest.

11. The aircraft passenger seat according to claim 8, further comprising vertically oriented rollers positioned along the at least one guideway facilitating movement of the at least one guide along the at least one guideway.

* * * * *